(12) United States Patent
Chen

(10) Patent No.: US 11,711,623 B2
(45) Date of Patent: Jul. 25, 2023

(54) VIDEO STREAM PROCESSING METHOD, DEVICE, TERMINAL DEVICE, AND COMPUTER-READABLE STORAGE MEDIUM

(71) Applicant: REALME CHONGQING MOBILE TELECOMMUNICATIONS CORP., LTD., Chongqing (CN)

(72) Inventor: Xuefan Chen, Chongqing (CN)

(73) Assignee: REALME CHONGQING MOBILE TELECOMMUNICATIONS CORP., LTD., Chongqing (CN)

(*) Notice: Subject to any disclaimer, the term of this patent is extended or adjusted under 35 U.S.C. 154(b) by 1 day.

(21) Appl. No.: 17/695,031

(22) Filed: Mar. 15, 2022

(65) Prior Publication Data

US 2022/0201205 A1 Jun. 23, 2022

Related U.S. Application Data

(63) Continuation of application No. PCT/CN2020/124150, filed on Oct. 27, 2020.

(30) Foreign Application Priority Data

Nov. 11, 2019 (CN) .......................... 201911095690.2

(51) Int. Cl.
*H04N 23/951* (2023.01)
*H04N 5/783* (2006.01)
(Continued)

(52) U.S. Cl.
CPC ........... *H04N 23/951* (2023.01); *H04N 5/783* (2013.01); *H04N 7/0135* (2013.01);
(Continued)

(58) Field of Classification Search
CPC ........ H04N 23/45; H04N 23/80; H04N 23/90; H04N 23/951; H04N 5/783; H04N 7/0135
See application file for complete search history.

(56) References Cited

U.S. PATENT DOCUMENTS 8,797,439 B1* 8/2014 Coley ................ H04N 23/45
348/222.1
8,922,532 B2 12/2014 Choi et al.
(Continued)

FOREIGN PATENT DOCUMENTS

CN 101448099 A 6/2009
CN 104363374 A 2/2015
(Continued)

OTHER PUBLICATIONS

International Search Report and the Written Opinion dated Feb. 3, 2021 From the International Searching Authority Re. Application No. PCT/CN2020/124150, 13 pages.
(Continued)

*Primary Examiner* — Paul M Berardesca
(74) *Attorney, Agent, or Firm* — Bayes PLLC

(57) ABSTRACT

A video stream processing method, a device, a terminal device, and a computer-readable storage medium are provided, including steps for acquiring a first video stream through a first camera and acquiring a second video stream through a second camera in response to receiving a slow-motion shooting instruction, the slow-motion shooting instruction carrying a frame rate of a slow-motion video stream; encoding the first video stream and the second video stream into a third video stream with a third frame rate, the third frame rate being greater than the first frame rate, and the third frame rate being greater than the second frame rate; and acquiring a fourth video stream with a fourth frame rate through performing a frame interpolation algorithm on the
(Continued)

third video stream, the fourth frame rate being the same as the frame rate of the slow-motion video stream.

20 Claims, 4 Drawing Sheets

(51) Int. Cl.
*H04N 7/01* (2006.01)
*H04N 23/90* (2023.01)
*H04N 23/667* (2023.01)
*H04N 23/63* (2023.01)

(52) U.S. Cl.
CPC ......... *H04N 23/632* (2023.01); *H04N 23/667* (2023.01); *H04N 23/90* (2023.01)

(56) References Cited

U.S. PATENT DOCUMENTS

| | | | |
|---|---|---|---|
| 2008/0211941 A1* | 9/2008 | Deever | H04N 23/73 |
| | | | 348/E5.037 |
| 2014/0169765 A1 | 6/2014 | Wang et al. | |
| 2015/0147042 A1 | 5/2015 | Miyahara et al. | |
| 2015/0221335 A1 | 8/2015 | Licata | |
| 2016/0155472 A1 | 6/2016 | Elg et al. | |
| 2017/0013192 A1 | 1/2017 | Yang | |
| 2018/0007283 A1 | 1/2018 | El Choubassi et al. | |
| 2018/0174365 A1* | 6/2018 | Cancel Olmo | G06F 3/011 |
| 2021/0092321 A1* | 3/2021 | Li | G11B 27/34 |
| 2021/0256670 A1* | 8/2021 | Woodall | H04N 23/741 |
| 2021/0258510 A1* | 8/2021 | Woodall | G06T 5/50 |

FOREIGN PATENT DOCUMENTS

| | | | | |
|---|---|---|---|---|
| CN | 105812651 A | | 7/2016 | |
| CN | 105847636 A | | 8/2016 | |
| CN | 106210584 A | | 12/2016 | |
| CN | 108683852 A | | 10/2018 | |
| CN | 109819161 A | | 5/2019 | |
| CN | 110086905 A | | 8/2019 | |
| CN | 110636375 A | | 12/2019 | |
| CN | 110650294 A | | 1/2020 | |
| CN | 110868560 A | * | 3/2020 | ......... H04N 5/23232 |
| CN | 110868560 A | | 3/2020 | |
| EP | 0662768 B1 | | 3/2000 | |
| WO | 2019183784 A1 | | 10/2019 | |

OTHER PUBLICATIONS

The first Office Action dated Mar. 3, 2021 from from China Application No. 201911095690.2, 21 pages.
The first Second Action dated Sep. 23, 2021 from from China Application No. 201911095690.2, 22 pages.
The Notice of Allowance dated Jan. 6, 2022 from from China Application No. 201911095690.2, 4 pages.
Supplementary Search Report dated Nov. 17, 2022 From the Extended European search report(EESR) of the Application No. 20888442.9.

* cited by examiner

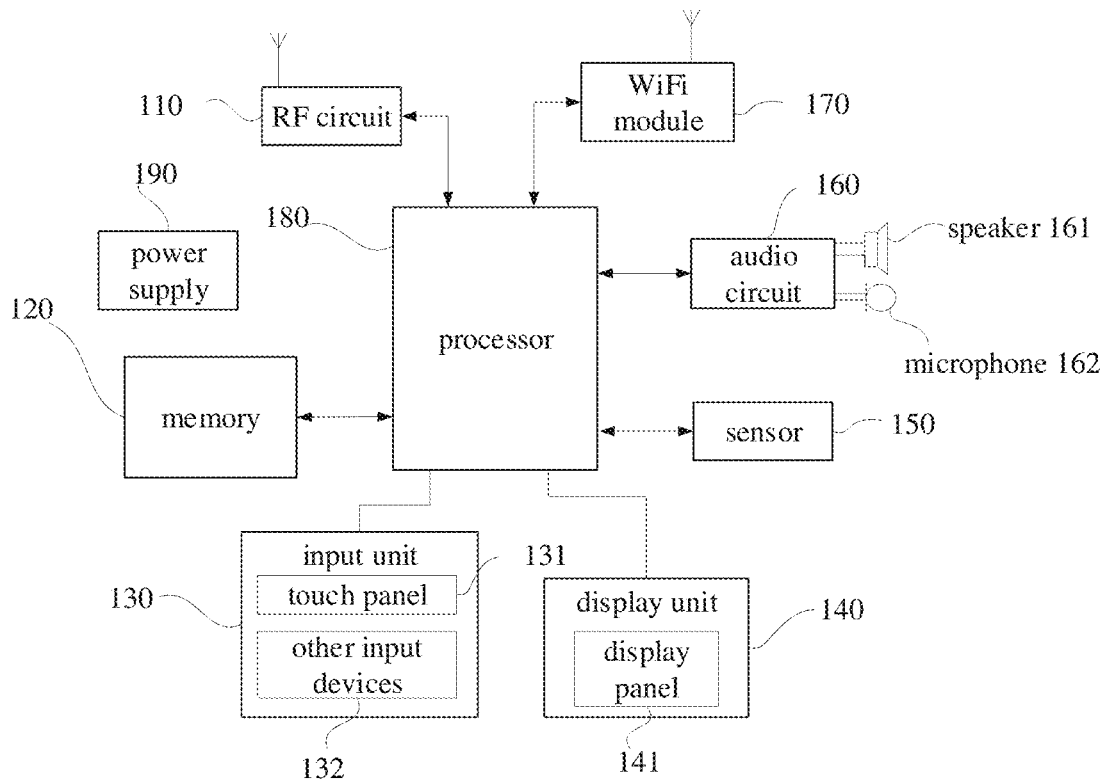

FIG. 1 acquiring a first video stream through the first camera and acquiring a second video stream through the second camera in response to receiving a slow-motion shooting instruction, wherein the slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output — S21 encoding the first video stream and the second video stream into a third video stream with a third frame rate, wherein the third frame rate is greater than the first frame rate, and the third frame rate is greater than the second frame rate — S22 acquiring a fourth video stream with a fourth frame rate through performing a frame interpolation algorithm on the third video stream, wherein the fourth frame rate is the same as the frame rate of the slow-motion video stream carried by the slow-motion shooting instruction, and the fourth frame rate is greater than the third frame rate — S23

FIG. 2

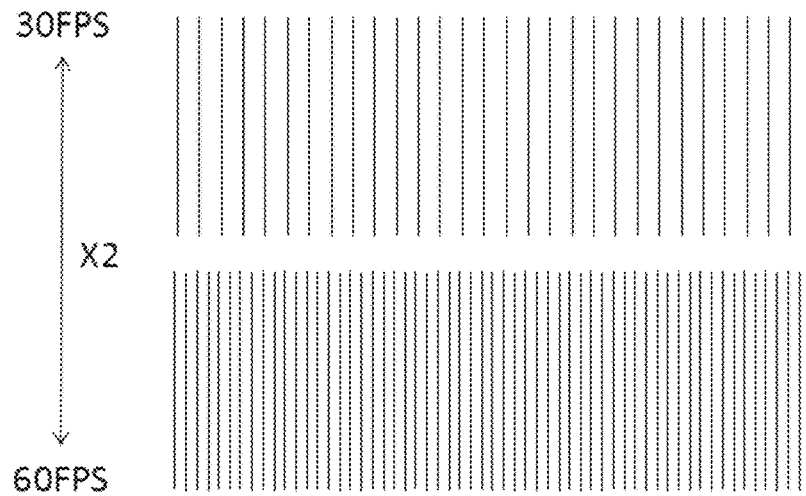

FIG. 3

| acquiring a first video stream through the first camera and acquiring a second video stream through the second camera in response to receiving a slow-motion shooting instruction, wherein the slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output | S41 |

↓

| acquiring a duration of a predetermined slow-motion video stream | S42 |

↓

| selecting a middle segment video frame of the first video stream and a middle segment video frame of the second video stream according to the duration of the predetermined slow-motion video stream, and encoding the selected two middle segment video frames into the third video with the third frame rate stream | S43 |

↓

| acquiring a fourth video stream with a fourth frame rate through performing a frame interpolation algorithm on the third video stream | S44 |

↓

| saving following video streams in order and serving the saved video streams as the slow-motion video stream: a front segment video stream generated according to a front segment video frame of the first video stream and a front segment video frame of the second video stream, the fourth video stream, and a back segment video stream generated according to a back segment video frame of the first video stream and a back segment video frame of the second video stream | S45 |

FIG. 4

| fast 30FPS | slow 7680FPS | fast 30FPS |
|:---:|:---:|:---:|
| 1s | 32s | 1s |
FIG. 5
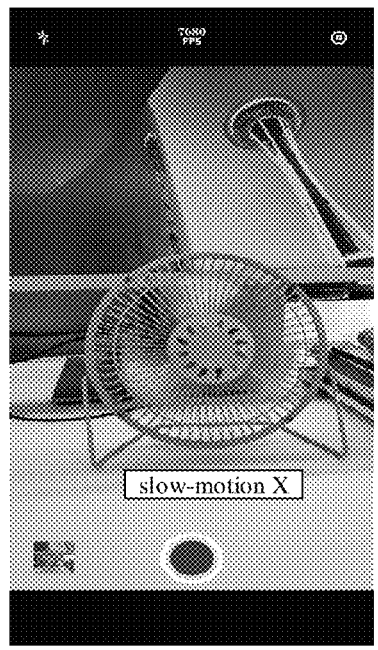
FIG. 6 (1)
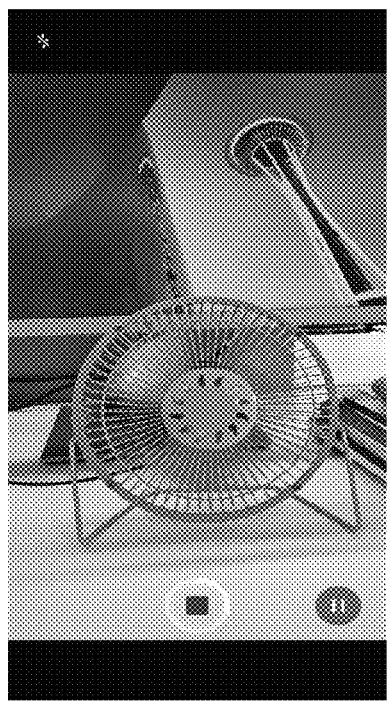
FIG. 6 (2)

VIDEO STREAM PROCESSING METHOD, DEVICE, TERMINAL DEVICE, AND COMPUTER-READABLE STORAGE MEDIUM

CROSS REFERENCE TO RELATED APPLICATIONS

This application is a continuation of International Application No. PCT/CN2020/124150, filed on Oct. 27, 2020, which claims priority to Chinese Patent Application No. 201911095690.2 filed on Nov. 11, 2019, the entire contents of which are incorporated herein by reference in their entireties.

FIELD OF DISCLOSURE

The present disclosure relates to the field of video processing technologies, and in particular, to a video stream processing method, a device, a terminal device, and a computer-readable storage medium.

BACKGROUND

Slow-motion is achieved by recording and storing as many frames as possible in a same time. When playing, it is still played according to a normal frame rate, such as 30 FPS (frames per second). That is, a higher frame rate is used to record video frames, and a lower frame rate is used to play the recorded video frames. This method is called high frame rate recording (HFR). The slow-motion is recorded with this high frame rate, and a "slow" effect can be achieved by playing with a low frame rate. In comparison with the normal video frame rate (30 FPS), the slow-motion video of 120 FPS will be 120/30=4 times slower.

With a gradual increase in a frame rate and bandwidths of sensors, a slow-motion solution is gradually developing towards a higher frame rate, better image quality, and higher fluency. However, current hardware on markets is difficult to support the high frame rate.

SUMMARY OF DISCLOSURE

Embodiments of the present disclosure provide a video stream processing method, a device, a terminal device, and a computer-readable storage medium.

In a first aspect, an embodiment of the present disclosure provides a video stream processing method, the video stream processing method is applied to a terminal device, a first camera and a second camera are arranged on a same side of the terminal device, and the video stream processing method includes a step for acquiring a first video stream through the first camera and acquiring a second video stream through the second camera in response to receiving a slow-motion shooting instruction. The slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output.

The method also includes a step for encoding the first video stream and the second video stream into a third video stream with a third frame rate. The third frame rate is greater than the first frame rate, and the third frame rate is greater than the second frame rate.

The method also includes a step for acquiring a fourth video stream with a fourth frame rate through performing a frame interpolation algorithm on the third video stream. The fourth frame rate is the same as the frame rate of the slow-motion video stream carried by the slow-motion shooting instruction, and the fourth frame rate is greater than the third frame rate.

In a second aspect, an embodiment of the present disclosure provides a video stream processing device, and the video stream processing device is applied to a terminal device, a first camera and a second camera are arranged on a same side of the terminal device, and the video stream processing device includes a video stream acquiring unit, a video stream encoding unit, and a fourth video stream generating unit.

The video stream acquiring unit is configured to acquire a first video stream through the first camera and acquire a second video stream through the second camera in response to receiving a slow-motion shooting instruction. The slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output.

The video stream encoding unit is configured to encode the first video stream and the second video stream into a third video stream with a third frame rate. The third frame rate is greater than the first frame rate, and the third frame rate is greater than the second frame rate.

The fourth video stream generating unit is configured to acquire a fourth video stream with a fourth frame rate through performing a frame interpolation algorithm on the third video stream. The fourth frame rate is the same as the frame rate of the slow-motion video stream carried by the slow-motion shooting instruction, and the fourth frame rate is greater than the third frame rate.

In a third aspect, an embodiment of the present disclosure provides a terminal device, including at least two cameras, a memory, a processor, and a computer program stored in the memory and executable by the processor. When the computer program is executed, the processor implements the method described in the first aspect.

In a fourth aspect, an embodiment of the present disclosure provides a computer-readable storage medium. A computer program is stored in the computer-readable storage medium, and when the computer program is executed, a processor implements the method described in the first aspect.

In a fifth aspect, an embodiment of the present disclosure provides a computer program product. When the computer program product runs on a terminal device, the terminal device is caused to execute the method described in the first aspect above.

BRIEF DESCRIPTION OF DRAWINGS

In order to more clearly illustrate technical solutions in the embodiments of the present disclosure, accompanying drawings required to be used in the description of the embodiments or exemplary technologies will be briefly introduced below.

FIG. 1 illustrates a schematic structural diagram of a mobile phone to which a video stream processing method of an embodiment of the present disclosure is applicable.

FIG. 2 illustrates is a flowchart of a video stream processing method of an embodiment of the present disclosure.

FIG. 3 illustrates a schematic diagram of interpolating frame and multiplying 30 FPS by 2 times through an interpolation algorithm of an embodiment of the present disclosure.

FIG. 4 illustrates a flowchart of another video stream processing method of an embodiment of the present disclosure.

FIG. 5 illustrates a schematic diagram of a strategy for generating fast-slow-fast intervals for a slow-motion video stream of an embodiment of the present disclosure.

FIG. 6(1) and FIG. 6(2) illustrate schematic diagrams of scenes for recording a slow-motion video stream of an embodiment of the present disclosure.

DETAILED DESCRIPTION

Figure 7:
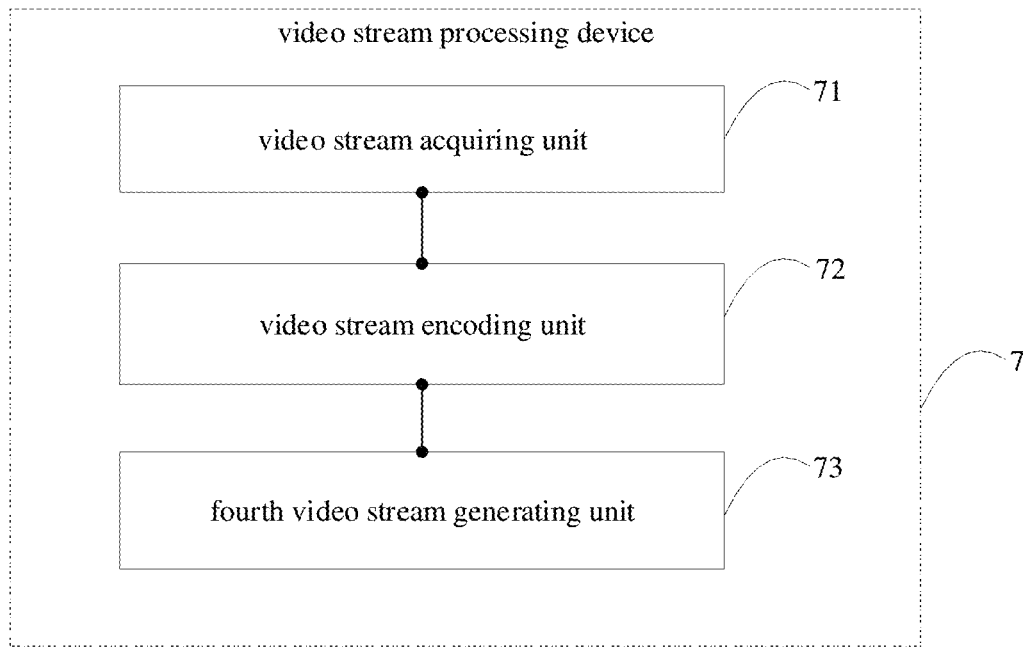
FIG. 7 illustrates a schematic structural diagram of a video stream processing device of an embodiment of the present disclosure.

In the following description, for purpose of illustration instead of limitation, specific system architectures, technical details, and the like are proposed in order to provide a thorough understanding of implementations of the present disclosure. However, those skilled in the art should be noted that, technical schemes of the present disclosure can also be implemented in other implementations without these specific details. Under some circumstances, detailed description of well-known systems, devices, circuits, and methods are omitted to avoid redundancy.

It should be understood that, in the specification and appended claims of the present disclosure, a term "comprise" indicates presence of the described feature, the described entirety, the described step, the described operation, the described element, and/or the described component, but does not exclude presence or addition of one or more other features, entireties, steps, operations, elements, components, and/or a collection thereof.

It should be further understood that, terms "and/or" used in the specification and the appended claims of the present disclosure refer to any combination and all possible combinations of one or more of the associated items listed, and include these combinations.

As used in the specification and the appended claims of the present disclosure, a term "if" may be interpreted as "when", "once", "in response to determining" or "in response to detecting" according to the context. Likewise, a phrase "if determining" or "if detecting (the described condition or event)" may be interpreted as meaning "once determining" or "in response to determining", or "once detecting (the described condition or event)" or "in response to detecting (the described condition or event)" according to the context.

Furthermore, in the specification and the appended claims of the present disclosure, terms "first", "second", "third" and so on are only used for descriptive purpose, but should not be understood as indicating or hinting to have importance in relativity.

Reference to "an embodiment", "some embodiments", or the like described in the specification of the present disclosure indicates that one or more embodiments of the present disclosure include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, but mean "one or more but not all of the embodiments", unless otherwise specified. Terms "include", "comprise", "have", and their variants all mean "include but are not limited to", unless otherwise specified.

The video stream processing method of the embodiments of the present disclosure can be applied to terminal devices, such as mobile phones, tablets, wearable devices, in-vehicle devices, augmented reality (AR)/virtual reality (VR) devices, notebooks, ultra-mobile personal computers (UMPCs), netbooks, personal digital assistant (PDA), and so on. The embodiments of the present disclosure do not impose any restrictions on the specific type of the terminal devices.

For example, the terminal device may be a station (ST) in a wireless local area network (WLAN), and may be a cellular phone, a cordless phone, a session initiation protocol (SIP) phone, a wireless local loop (WLL) station, a personal digital assistant (PDA) device, a handheld device with a wireless communication function, a computing device, another processing device connected to a wireless modem, a vehicle-mounted device, an internet of vehicles terminal, a computer, a laptop computer, a handheld communications device, a handheld computing device, a satellite wireless device, a wireless modem card, a television set-top box (STB), customer premises equipment (CPE), and/or other devices configured to communicate on a wireless system, and a next generation communications system, for example, a terminal device in a 5G network and a terminal device in a future evolved public land mobile network (PLMN).

By way of example and not limitation, when the terminal is a wearable device, the wearable device may be a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. Generalized wearable intelligent devices include full-featured and large-sized devices that can implement complete or partial functions without depending on smartphones, such as smartwatches or smart glasses, and devices that focus on only one type of application and need to work with other devices such as smartphones, such as various smart bands or smart jewelries for vital sign monitoring.

Take the terminal device as a mobile phone as an example. FIG. 1 is a block diagram illustrating a partial structure of a mobile phone of an embodiment of the present disclosure. Referring to FIG. 1, the mobile phone includes a radio frequency (RF) circuit 110, a memory 120, an input unit 130, a display unit 140, a sensor 150, an audio circuit 160, a wireless fidelity (WiFi) module 170, a processor 180, a power supply 190, and other components. Those skilled in the art can understand that the structure of the mobile phone illustrated in FIG. 1 does not constitute a limitation to the mobile phone, and the mobile phone may include more or less components than those illustrated, or a combination of certain components, or different component arrangements.

Various components of the mobile phone are described in detail with reference to FIG. 1.

The RF circuit 110 can be used for transmitting and receiving information, or receiving and transmitting signals during a call. Specifically, after receiving downlink information of a base station, the RF circuit 110 transmits the downlink information to the processor 180 for processing.

In addition, the RF circuit 110 transmits related uplink data to the base station. Generally, the RF circuit includes, but is not limited to, an antenna, at least one amplifier, a transceiver, a coupler, a low noise amplifier (LNA), a duplexer, etc.

In addition, the RF circuit 110 can also communicate with the network and other devices through wireless communication. The wireless communication can use any communication standard or protocol, including but not limited to global system of mobile communication (GSM), general packet radio service (GPRS), and code division multiple access (CDMA), wideband code division multiple access (WCDMA), long term evolution (LTE), e-mail, short messaging service (SMS), and the like.

The memory 120 can be used to store software programs and modules. The processor 180 executes various functional applications and data processing of the mobile phone by running the software programs and the modules stored in the memory 120. The memory 120 may mainly include a storage program area and a storage data area, where the storage program area may store an operating system, an application required for at least one function (such as a sound playing function, an image playing function, etc.), and the like. The storage data area may store data, such as audio data, phone books, etc., which are created according to the use of the electronic devices. Moreover, the memory 120 may include a high speed random access memory, and may also include a non-volatile memory, such as at least one magnetic disk storage device, flash memory device, or other volatile solid state storage devices.

The input unit 130 can be configured to receive input digital or character information, as well as generate signal inputs related to user settings and function controls. Specifically, the input unit 130 may include a touch panel 131 and other input devices 132. The touch panel 131 is also called a touch screen, and can collect user's touch operations on or near the touch panel 131 (e.g., the user uses any suitable object or accessory such as a finger, a stylus, etc., to operate on or near the touch panel 131), and drive corresponding connecting devices according to preset programs. Alternatively, the touch panel 131 may include two parts: a touch detection device and a touch controller. The touch detection device detects the touch orientations of the user, and detects signals brought by the touch operations, and transmits the signals to the touch controller. The touch controller receives touch information from the touch detection device, converts the touch information into contact coordinates, sends the contact coordinates to the processor 180, and may receive commands from the processor 180 and execute them.

In addition, the touch panel 131 can be implemented in a variety of types, including resistive, capacitive, infrared, surface acoustic waves, and the like. Besides the touch panel 131, the input unit 130 can further include other input devices 132. Specifically, the other input devices 132 may include, but are not limited to, one or more of the following: a physical keyboard, function keys (such as a volume control button, a switch button, etc.), a trackball, a mouse, a joystick, and the like.

The display unit 140 can be used to display information entered by the user or information provided to the user and various menus of the mobile phone. Alternatively, a display panel 141 can be configured in the form of a liquid crystal display (LCD), an organic light-emitting diode (OLED), or the like. Furthermore, the touch panel 131 can cover the display panel 141. When the touch panel 131 detects a touch operation on or near it, the touch panel 131 transmits the touch operation to the processor 180 to determine the type of a touch event, and then the processor 180 displays a corresponding visual output on the display panel 141 according to the type of the touch event. Although in FIG. 1, the touch panel 131 and display panel 141 are implemented as two separate components to perform input and input functions of the mobile phone, in some implementations, the touch panel 131 can be integrated with the display panel 141 to implement the input and output functions of the mobile phone.

The mobile phone 100 can also include at least one type of sensor 150, such as a light sensor, a motion sensor, and other sensors. Specifically, the light sensor may include an ambient light sensor and a proximity sensor, where the ambient light sensor may adjust the brightness of the display panel 141 according to the brightness of the ambient light, and the proximity sensor may turn off the display panel 141 and/or backlight when the mobile phone moves to the ear. As a kind of motion sensor, a gravity acceleration sensor can detect the acceleration in all directions (generally three axes). When it is stationary, it can detect the magnitude and direction of gravity. It can be used to identify the attitude applications of the mobile phone (such as horizontal and vertical screen switching, related games, magnetometer attitude calibration), vibration recognition related functions (such as pedometer, tapping), etc. The mobile phone can also be configured with other sensors, such as gyroscopes, barometers, hygrometers, thermometers, infrared sensors, and the like, which are not described herein.

The audio circuit 160 can provide an audio interface between the user and the mobile phone through a speaker 161 and a microphone 162. The audio circuit 160 can convert the received audio data into an electrical signal, which is transmitted to the speaker 161, and converted into a sound signal output by the speaker 161. On the other hand, the microphone 162 converts the collected sound signal into an electrical signal, which is received and converted into audio data by the audio circuit 160. Then the audio data is output to the processor 180 and processed by the processor 180, and transmitted via the RF circuit 110 to, for example, another mobile phone, or the audio data is output to the memory 120 for further processing.

WiFi is a short-distance wireless transmission technology. The mobile phone can help users send and receive e-mail, browse web pages and access streaming media through the WiFi module 170, which provides users with wireless broadband Internet access. Although FIG. 1 illustrates the WiFi module 170, it can be understood that it does not belong to the essential configuration of the mobile phone 100, and may be omitted as needed within the scope of not changing the essence of the disclosure.

The processor 180 is a control center of the mobile phone, and connects various parts of the entire mobile phone using various interfaces and lines. The processor 180 performs various functions and processes data of the mobile phone by running or executing the software programs and/or the modules stored in the memory 120 and calling data stored in the memory 120, thereby realizing the overall monitoring of the mobile phone. Optionally, the processor 180 may include one or more processing units. Preferably, the processor 180 may integrate an application processor and a modem processor, where the application processor mainly processes an operating system, a user interface, an application, and the like. The modem processor primarily handles wireless communications. It will be appreciated that the above described modem processor may also not be integrated into the processor 180.

The mobile phone 100 further includes the power supply 190 (such as a battery) that supplies power to various components. Preferably, the power supply can be logically coupled to the processor 180 through a power management system, to manage functions such as charging, discharging, and power management through the power management system.

Although not illustrated in FIG. 1, the mobile phone 100 may further include cameras. Alternatively, the cameras may be disposed in the front or the rear of the mobile phone 100. This is not limited in this embodiment of the present disclosure.

Alternatively, the mobile phone 100 may include dual cameras or triple cameras, etc., which are not limited in the embodiments of the present disclosure.

For example, the mobile phone 100 may include three cameras, where one is a main camera, one is a wide-angle camera, and the other is a telephoto camera.

Alternatively, when the mobile phone 100 includes a plurality of cameras, the plurality of cameras may all be disposed in the front, or may all be disposed in the rear, or at least two cameras may be disposed in the front, and others may be disposed in the rear. This is not limited in this embodiment of the present disclosure.

In addition, although not shown, the mobile phone 100 may further include a Bluetooth module, and the like. Details are not described herein again.

The following embodiments can be implemented on the mobile phone 100 having the above-mentioned hardware structure/software structure.

The following embodiments will take the mobile phone 100 as an example to describe a video stream processing method of the embodiments of the present disclosure. In this embodiment, two cameras (a first camera and a second camera) are disposed on a same side of a terminal device (mobile phone) (for example, both are disposed on a back side of the mobile phone). The first camera and the second camera can directly output video streams with higher frame rate.

For example, they directly output 960 FPS video stream. In order to obtain a wider field of view, the second camera is a wide-angle camera (the first camera is a main camera). Of course, if there is no requirement for the field of view in an actual situation, the second camera can also be a macro camera, which is not limited here. In this embodiment, when the user needs to shoot a slow-motion video stream, the first camera and the second camera will be activated. The mobile phone acquires two video streams. By encoding the two video streams, and then the encoded video stream is subjected an interpolation algorithm, a video stream with a higher frame rate is obtained. In this way, when playing at a same frame rate, the slow-motion video stream with the higher frame rate can be obtained.

FIG. 2 illustrates is a flowchart of a video stream processing method of an embodiment of the present disclosure. The video stream processing method is applied to a terminal device. A first camera and a second camera are arranged on a same side of the terminal device. The video stream processing methods include the following steps.

In a step S21, in response to receiving a slow-motion shooting instruction, a first video stream is acquired through the first camera and a second video stream is acquired through the second camera. The slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output.

In this embodiment, when the user triggers an icon displayed on a preview interface for the slow-motion shooting, the terminal device will receive the slow-motion shooting instruction. The slow-motion shooting instruction carries the frame rate corresponding to a current slow-motion mode.

In some embodiments, in order for the user to know the frame rate of the slow-motion video stream currently being shot, the frame rate of the slow-motion video stream carried by the slow-motion shooting instruction is displayed in the preview interface.

For example, when the frame rate is 7680 FPS, the preview interface displays 7680 FPS.

In some embodiments, in order to quickly respond to the slow-motion shooting instruction, before receiving the slow-motion shooting instruction, the method includes an operation of initializing a class for acquiring audio and video (MediaRecorder): configuring a basic data stream format (for example, configuring a MP4 format), a data source (indicating whether to acquire the video frames from the camera or using another app), and the video bitrate, etc. In this way, after the slow-motion shooting instruction is received, the slow-motion shooting instruction can be quickly responded to directly according to the initialized information.

In this embodiment, in order to enable the first camera and the second camera to directly output the video stream with a larger frame rate, the first camera and the second camera have powerful pixel caching capabilities.

For example, a three-layer stacked dynamic random access memory (DRAM) complementary metal-oxide-semiconductor (CMOS) sensor is added to the first camera and the second camera.

For example, the first camera and the second camera support direct output of 960 FPS, etc.

It should be pointed out that the above-mentioned first video stream and second video stream are video streams acquired at the same time.

In a step S22, the first video stream and the second video stream are encoded into a third video stream with a third frame rate. The third frame rate is greater than the first frame rate, and the third frame rate is greater than the second frame rate.

In this embodiment, since the first camera and the second camera are both arranged on the same side of the terminal device, and a shooting time is the same, the first video stream and the second video stream include similar thing information. Thus, the video frames corresponding to adjacent times in the first video stream and the second video stream can be directly combined.

For example, the first frame of the first video stream serves as a first frame of the third video stream, the first frame of the second video stream serves as a second frame of the third video stream, etc., so as to obtain more video frames. That is, the third video stream with the higher frame rate is obtained.

In a step S23, a fourth video stream with a fourth frame rate is acquired through performing a frame interpolation algorithm on the third video stream. The fourth frame rate is the same as the frame rate of the slow-motion video stream carried by the slow-motion shooting instruction, and the fourth frame rate is greater than the third frame rate.

In this embodiment, the frame rate of the fourth video stream obtained by the frame insertion is the same as the frame rate of the slow-motion video stream carried by the slow-motion shooting instruction.

For example, if the frame rate of the slow-motion video stream carried by the slow-motion shooting instruction is 7680 FPS, the frame rate of the fourth video stream is also 7680 FPS.

In the embodiment of the present disclosure, in response to receiving the slow-motion shooting instruction, the first video stream is acquired from the first camera and the second video stream is acquired from the second camera. The slow-motion shooting instruction carries the frame rate of the slow-motion video stream. The first video stream and the second video stream are encoded into the third video stream with the third frame rate, the third frame rate is greater than the first frame rate, and the third frame rate is greater than the second frame rate. The fourth video stream with the fourth frame rate is acquired through performing the frame interpolation algorithm on the third video stream, the fourth frame rate is the same as the frame rate of the slow-motion video stream carried by the slow-motion shooting instruction, and the fourth frame rate is greater than the third frame rate. Since the fourth frame rate is greater than the third frame rate, and the third frame rate is greater than the first frame rate and greater than the second frame rate, that is, the acquired frame rate of the fourth video stream is greater than the first frame rate and greater than the second frame rate, it is guaranteed that the frame rate of the acquired slow-motion video stream (that is, the fourth video stream) is greater than the frame rate that can be directly output by the first camera and the second camera. Thus, the acquired slow-motion video stream has better image quality and higher fluency.

In some embodiments, since the first video stream is acquired by the first camera and the second video stream is acquired by the second camera, and the acquisition frame rates of the first camera and the second camera may be different, in order to facilitate the subsequent quick encoding of the third video stream and the subsequent interpolation algorithm to obtain the fourth video stream, the first frame rate and the second frame rate need to be unified before the third video stream is generated. At this time, the step S22 includes the following.

A1, if the first frame rate is greater than the second frame rate, a fifth video stream with the first frame rate is acquired through performing an interpolation algorithm on the second video stream, and the first video stream and the fifth video stream are cross-encoded into the third video stream with the third frame rate.

A2, if the first frame rate is equal to the second frame rate, the first video stream and the second video stream are cross-encoded into the third video stream with the third frame rate.

In this embodiment, in order to obtain the higher frame rate, the second video stream with a lower frame rate (the frame rate is the second frame rate) is interpolated into the fifth video stream with the higher frame rate (the frame rate is the first frame rate).

For example, if the first frame rate is 1920 FPS and the second frame rate is 960 FPS, the second video stream is first interpolated to the fifth video stream with 1920 FPS. Then the first video stream and the fifth video stream are cross-encoded into the third video stream with the third frame rate (3840 FPS).

In some embodiments, in order to improve a speed of the interpolation algorithm, the terminal device can have excellent platform bandwidth processing capability and powerful performance, for example, have a Qualcomm® Snapdragon™ 8 series processor.

In some embodiments, the interpolation algorithm will take some time. Therefore, in order to reduce a waiting time for the user to shoot the slow-motion video stream, the step of acquiring the fourth video stream by interpolation will be triggered after receiving a play instruction issued by the user, rather than after acquiring the third video stream. At this time, the step S23 includes the following.

If a play instruction issued by a user is received, the fourth video stream with the fourth frame rate is acquired through performing the frame interpolation algorithm on the third video stream.

In this embodiment, if the play instruction issued by the user is received, a corresponding magnification is determined according to the frame rate of the slow-motion video stream carried by the slow-motion shooting instruction, and then the corresponding interpolation algorithm is executed to obtain the fourth video stream with the same frame rate.

For example, if the third frame rate of the third video stream is 1920 FPS, and the frame rate of the slow-motion video stream carried by the slow-motion shooting instruction is 7680 FPS, the interpolation algorithm is performed to interpolate frame and multiply the third video stream by 4 times to achieve 7680 FPS. Referring to FIG. 3, FIG. 3 illustrates a schematic diagram of interpolating frame and multiplying 30 FPS by 2 times through the interpolation algorithm.

In some embodiments, if the step of acquiring the fourth video stream by interpolation will be triggered after receiving the play instruction issued by the user, in order to facilitate the user to quickly find the slow-motion video stream to be played. After the step S22, the method includes the following.

A slow-motion video stream identifier is written to the third video stream, and it is saved.

Correspondingly, after the step S23, the method includes the following.

The saved third video stream is replaced with the fourth video stream.

In this embodiment, in addition to writing the slow-motion video stream identifier to the third video stream, such as writing "slow motion hfr", the frame rate of the slow-motion video stream can also be written, such as "slow motion hfr 7680". Of course, a time for saving the third video stream can also be further written, which is not limited here. After saving the third video stream, if the play instruction issued by the user is received, after acquiring the fourth video stream with the fourth frame rate through performing the frame interpolation algorithm on the third video stream, a real slow-motion video stream (fourth video stream) is saved to replace the previously saved third video stream. In this way, after the user issues the play instruction of the fourth video stream, the terminal device does not need to interpolate the fourth video stream again, so that the fourth video stream can be played directly, and a response speed of the play instruction is improved.

FIG. 4 illustrates a flowchart of another video stream processing method of an embodiment of the present disclosure. In this embodiment, in order to make the user feel the "slowness" of the slow-motion video stream more clearly, the acquired first video stream and second video stream are divided into three video frames of duration respectively. Only a video frame of a second duration is processed as a slow-motion video stream, and the video frames of the other two segments maintain the normal frame rate. In this way, the user will get a "fast-slow-fast" feeling when watching the acquired video stream. That is, it can better highlight the impact of slow-motion video stream on users. Details are as follows.

In a step S41, in respond to receiving the slow-motion shooting instruction, the first video stream is acquired from the first camera and the second video stream is acquired from the second camera. The slow-motion shooting instruction carries the frame rate of the slow-motion video stream. The first frame rate of the first video stream is the maximum frame rate that the first camera can directly output, and the second frame rate of the second video stream is the maximum frame rate that the second camera can directly output.

In a step S42, a duration of a predetermined slow-motion video stream is acquired.

Specifically, since the slow-motion video stream in the embodiments of the present disclosure is not directly output through the camera, it also needs to go through some interpolation algorithms, and the interpolation algorithm will take a certain period of time, in order to prevent users from waiting for a long time, the duration of the slow-motion video stream cannot be set too large.

For example, it is recommended to set the duration of the slow-motion video stream to be less than 3 minutes, preferably 34 seconds, etc.

In a step S43, a middle segment video frame of the first video stream and a middle segment video frame of the second video stream are selected according to the duration of the predetermined slow-motion video stream, and the selected two middle segment video frames are encoded into the third video with the third frame rate stream.

In order to ensure that the fourth video stream of sufficient duration is obtained, and the duration of the fourth video stream is related to the duration of the selected middle segment video frame, the duration of any selected middle segment video frame meets a following condition: [a duration of the middle segment video frame/(a duration of a front segment video frame+a duration of the middle segment video frame+a duration of a back segment video frame)] is greater than 90%. The duration of the front segment video frame+the duration of the middle segment video frame+the duration of the back segment video frame is equal to the duration of the entire video frame.

For example, assuming that the predetermined slow-motion video stream has the duration of 34 seconds, the first video stream with a duration of 34 seconds is determined. Then, the duration of the front segment video frame is set to be 1 second from the first video stream with the duration of 34 seconds, the duration of the middle segment video frame is 32 seconds, and the duration of the back segment video frame is 1 second, that is, it is guaranteed that 32/34=94%, and the 94%>92%.

In a step S44, the fourth video stream with the fourth frame rate is acquired through performing the frame interpolation algorithm on the third video stream.

In a step S45, following video streams are saved in order and the saved video streams serves as the slow-motion video stream: the front segment video stream generated according to a front segment video frame of the first video stream and a front segment video frame of the second video stream, the fourth video stream, and the back segment video stream generated according to a back segment video frame of the first video stream and a back segment video frame of the second video stream.

Referring to FIG. 5, assuming that the duration of the generated slow-motion video stream is 34 seconds, the duration of the front segment video stream can be set to 1 second, the duration of the fourth video stream is 32 seconds, and the duration of the back segment video stream is 1 second. That is, when the entire slow-motion video stream is played, the user will be given a "fast-slow-fast" viewing experience. Through such a generation strategy, not only processing time is saved, but also the change of speed before and after can be better compared, and the slow part can be more prominent. It should be pointed out that 30 FPS and 7680 FPS in FIG. 5 are only examples, and are not limited here.

In some embodiments, since the first frame rate is higher than the second frame rate, that is, the first camera is used as the main camera, the first video stream acquired by the first camera can be directly displayed on a preview interface. At this time, after the step S21, the method includes the following.

The first video stream is displayed on the preview interface.

In this embodiment, since only the first video stream is displayed on the preview interface, that is, the second video stream acquired by the second camera serving as an auxiliary camera is ignored, and the first video stream is not interpolated, the preview can be quickly implemented in the preview interface without waiting for the user.

In some embodiments, the user cannot obtain more information about static objects from the slow-motion video stream, but can obtain more information about dynamic objects. The higher the recorded frame rate, the more information the user can obtain from the slow-motion video stream being played. Therefore, a matching recording frame rate can be recommended according to a speed of the photographed object. At this time, if slow-motion modes are greater than or equal to 2, and different slow-motion modes correspond to different frame rates, before the step S21, the method includes the following.

If the camera is in the slow-motion mode, a corresponding slow-motion mode is recommended according to a motion speed of an object in the preview interface. A recommended strategy is that the greater the motion speed of the object, the slow-motion mode corresponding to the larger frame rate is recommended.

In this embodiment, if the terminal device detects that it has entered the slow-motion mode of the camera, it detects the speed of the object in the preview interface. If the speed of the object matches the recording frame rate of a slow-motion mode, the user is recommended to use the slow-motion mode to record the slow-motion video stream in the preview interface. Alternatively, it is directly switched to the slow-motion mode, and the information that the slow-motion mode has been switched is displayed in the preview interface. Specifically, the corresponding relationship between different speeds of the object and the slow-motion mode is preset.

For example, if M1≤the speed of the object<M2, a slow-motion mode 1 is recommended. If M2≤the speed of the object<M3, a slow-motion mode 2 is recommended.

In order to more clearly describe the video stream processing method of the embodiment of the present disclosure, a specific application example is described below.

1. The user turns on the camera to enter the slow-motion mode, and selects 7680 FPS, then simultaneously turns on the ultra-wide-angle camera of the main camera and the sub-camera, and starts the preview. The default is based on the data of the main camera, and the preview is drawn, as shown in FIG. 6(1).

2. initialization MediaRecorder: the basic data stream format, data source, and video bit rate are configured.

3. After the user clicks record, the two video surfaces (both video recording frame rates are 960 FPS) are input to MediaRecorder, video frames are acquired from the bottom layer and cross-encoded and decoded through libffmpeg library, and a 1920 FPS third video stream is output.

4. The obtained 1920 FPS is input to the frame interpolation algorithm library to interpolate and multiply by 4 times to achieve the fourth video stream of 7680 FPS. After recording, the media library is saved and updated, and a title slow_motion_hfr_7680_:0,0,0,0 is written to mark this video as the slow-motion video stream, which is used for gallery and video APP play identification. As shown in FIG. 6(2), when a record button is clicked, the start of recording will count down. The record button is processed in circles, the recording stops after the given angle of view is completed. The background starts to synthesize and process the two slow-motion video data to generate the final 7680 FPS slow-motion video stream in fast-slow-fast intervals.

It should be understood that the value of the serial number of each step in the foregoing embodiments does not mean the order of execution. An execution sequence of each step should be determined by its function and internal logic, and should not constitute any limitation on implementation processes of the embodiments of the present disclosure.

Corresponding to the video stream processing method described in the above embodiments, FIG. 7 illustrates a structural block diagram of a video stream processing device 7 of an embodiment of the present disclosure. The video stream processing device 7 is applied to a terminal device. A first camera and a second camera are arranged on a same side of the terminal device. For convenience of explanation, only parts related to the embodiments of the present disclosure are shown.

The video stream processing device 7 includes a video stream acquiring unit 71, a video stream encoding unit 72, and a fourth video stream generating unit 73.

The video stream acquiring unit 71 is configured to acquire a first video stream through the first camera and acquire a second video stream through the second camera in respond to receiving a slow-motion shooting instruction. The slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output.

In some embodiments, in order to quickly respond to the slow-motion shooting instruction, before receiving the slow-motion shooting instruction, the video stream processing device 7 includes an initialization unit configured to initialize a class for acquiring audio and video: configuring a basic data stream format, a data source, and the video bitrate, etc.

The video stream encoding unit 72 is configured to encode the first video stream and the second video stream into a third video stream with a third frame rate. The third frame rate is greater than the first frame rate, and the third frame rate is greater than the second frame rate.

The fourth video stream generating unit 73 is configured to acquire a fourth video stream with a fourth frame rate through performing a frame interpolation algorithm on the third video stream. The fourth frame rate is the same as the frame rate of the slow-motion video stream carried by the slow-motion shooting instruction, and the fourth frame rate is greater than the third frame rate.

In the embodiment of the present disclosure, since the fourth frame rate is greater than the third frame rate, and the third frame rate is greater than the first frame rate and greater than the second frame rate, that is, the acquired frame rate of the fourth video stream is greater than the first frame rate and greater than the second frame rate, it is guaranteed that the frame rate of the acquired slow-motion video stream (that is, the fourth video stream) is greater than the frame rate that can be directly output by the first camera and the second camera. Thus, the acquired slow-motion video stream has better image quality and higher fluency.

In some embodiments, since the first video stream is acquired by the first camera and the second video stream is acquired by the second camera, and the acquisition frame rates of the first camera and the second camera may be different, in order to facilitate the subsequent quick encoding of the third video stream and the subsequent interpolation algorithm to obtain the fourth video stream, the first frame rate and the second frame rate need to be unified before the third video stream is generated. At this time, the video stream encoding unit 72 includes the following.

An interpolating and encoding module is configured to if the first frame rate is greater than the second frame rate, acquire a fifth video stream with the first frame rate through performing an interpolation algorithm on the second video stream, and cross-encode the first video stream and the fifth video stream into the third video stream with the third frame rate.

A directly encoding module is configured to if the first frame rate is equal to the second frame rate, cross-encode the first video stream and the second video stream into the third video stream with the third frame rate.

In some embodiments, the interpolation algorithm will take some time. Therefore, in order to reduce a waiting time for the user to shoot the slow-motion video stream, the fourth video stream generating unit 73 is specifically configured to:

if a play instruction issued by a user is received, acquire the fourth video stream with the fourth frame rate through performing the frame interpolation algorithm on the third video stream.

In this embodiment, if the play instruction issued by the user is received, a corresponding magnification is determined according to the frame rate of the slow-motion video stream carried by the slow-motion shooting instruction, and then the corresponding interpolation algorithm is executed to obtain the fourth video stream with the same frame rate.

In some embodiments, in order to facilitate the user to quickly find the slow-motion video stream to be played, the video stream processing device 7 further includes the following.

A third video stream storage unit is configured to write the slow-motion video stream identifier to the third video stream, and save it.

Correspondingly, the video stream processing device 7 further includes a fourth video stream storage unit configured to replace the saved third video stream with the fourth video stream after acquiring the fourth video stream with the fourth frame rate through performing the frame interpolation algorithm on the third video stream.

In this embodiment, in addition to writing the slow-motion video stream identifier to the third video stream, such as writing "slow_motion_hfr", the frame rate of the slow-motion video stream can also be written, such as "slow_motion_hfr_7680". Of course, a time for saving the third video stream can also be further written, which is not limited here.

In this embodiment, in order to make the user feel the "slowness" of the slow-motion video stream more clearly, the acquired first video stream and second video stream are divided into three video frames of duration respectively.

Only a video frame of a second duration is processed as a slow-motion video stream, and the video frames of the other two segments maintain the normal frame rate. In this way, the user will get a "fast-slow-fast" feeling when watching the acquired video stream. That is, it can better highlight the impact of slow-motion video stream on users. At this time, the video stream encoding unit 72 includes the following.

A duration acquisition module of slow-motion video stream is configured to acquire a duration of a predetermined slow-motion video stream.

A middle segment video frame acquisition module is configured to select a middle segment video frame of the first video stream and a middle segment video frame of the second video stream according to the duration of the predetermined slow-motion video stream, and encode the selected two middle segment video frames into the third video with the third frame rate stream.

Correspondingly, the video stream processing device 7 further includes a slow-motion video stream storage unit configured to save following video streams in order and the saved video streams serve as the slow-motion video stream after acquiring the fourth video stream with the fourth frame rate through performing the frame interpolation algorithm on the third video stream: a front segment video stream generated according to a front segment video frame of the first video stream and a front segment video frame of the second video stream, the fourth video stream, and a back segment video stream generated according to a back segment video frame of the first video stream and a back segment video frame of the second video stream.

In some embodiments, since the first frame rate is higher than the second frame rate, that is, the first camera serves as the main camera, the first video stream obtained by the first camera can be directly displayed in the preview interface. In this case, the video stream processing device 7 further includes the following.

A preview unit is configured to display the first video stream on the preview interface.

In some embodiments, the user cannot obtain more information about static objects from the slow-motion video stream, but can obtain more information about dynamic objects. The higher the recorded frame rate, the more information the user can obtain from the slow-motion video stream being played. Therefore, a matching recording frame rate can be recommended according to a speed of the photographed object. If slow-motion modes are greater than or equal to 2, and different slow-motion modes correspond to different frame rates, if the slow-motion shooting instruction is received, the video stream processing device 7 further includes the following.

A recommended unit for slow motion mode is configured to recommend the corresponding slow-motion mode according to the motion speed of the object in the preview interface if the camera enters the slow-motion mode. The recommended strategy is that the larger the motion speed of the object, the slower the motion mode corresponding to the larger frame rate is recommended.

It should be noted that the information interaction and execution process between the above-mentioned devices/units are based on the same concept as the method embodiment of the present disclosure, and its specific functions and technical effects can be found in the method embodiment section, which will not be repeated herein.

Figure 8:
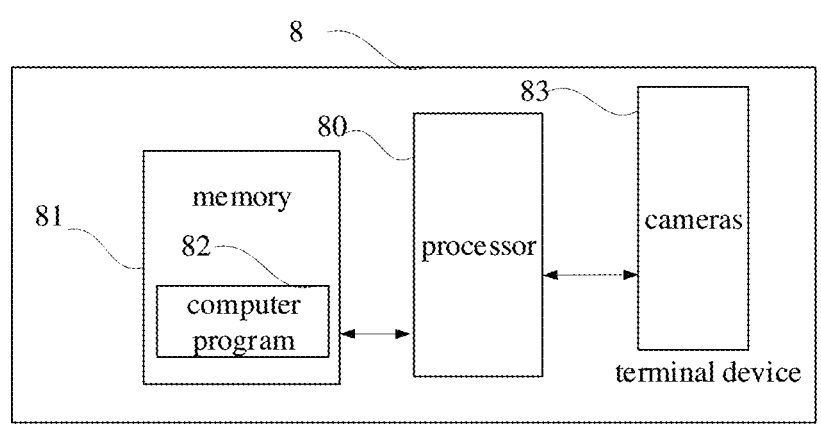
FIG. 8 illustrates a schematic structural diagram of a terminal device of an embodiment of the present disclosure.

FIG. 8 illustrates a schematic structural diagram of a terminal device of an embodiment of the present disclosure. As shown in FIG. 8, the terminal device 8 of this embodiment includes at least one processor 80 (only one processor is shown in FIG. 8), a memory 81, and a computer program 82 stored in the memory 81 and executable by the at least one processor 80, and at least two cameras 83. When the processor 80 executes the computer program 82, the steps in any of the foregoing method embodiments are implemented.

In respond to receiving a slow-motion shooting instruction, a first video stream is acquired through the first camera and a second video stream is acquired through the second camera. The slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output.

The first video stream and the second video stream are encoded into a third video stream with a third frame rate. The third frame rate is greater than the first frame rate, and the third frame rate is greater than the second frame rate.

A fourth video stream with a fourth frame rate is acquired through performing a frame interpolation algorithm on the third video stream. The fourth frame rate is the same as the frame rate of the slow-motion video stream carried by the slow-motion shooting instruction, and the fourth frame rate is greater than the third frame rate.

The terminal device 8 may be a computing device such as a desktop computer, a notebook, a palmtop computer, and a cloud server. The terminal device may include, but is not limited to, a processor 80 and a memory 81. Those skilled in the art can understand that FIG. 8 is only an example of the terminal device 8, and does not constitute a limitation on the terminal device 8. The terminal device 8 may include more or less components than shown, or some components may be combined, or different components, for example, may also include input and output devices, network access devices, and the like.

The so-called processor 80 may be a central processing unit (CPU). The processor 80 may also be another general-purpose processor, a digital signal processor (DSP), an application specific integrated circuits (ASIC), a field-programmable gate array (FPGA) or another programmable logic device, a discrete gate, or a transistor logic device, a discrete hardware component, and the like. The general-purpose processor may be a microprocessor or the processor may be any conventional processor or the like.

In some embodiments, the memory 81 may be an internal storage unit of the terminal device 8, such as a hard disk or a memory of the terminal device 8.

In other embodiments, the memory 81 may also be an external storage device of the terminal device 8, such as a plug-in hard disk, a smart memory card (SMC), a secure digital (SD) card, a flash card equipped on the terminal device 8. Furthermore, the memory 81 may also include both the internal storage unit of the terminal device 8 and the external storage device. The memory 81 is configured to store an operating system, an application program, a boot loader, data, and other programs, such as program codes of the computer program. The memory 81 can also be configured to storing data that has been output or being ready to be output temporarily.

It can be clearly understood by the one of ordinary skill in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above.

The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units.

In addition, specific names of the various functional units and modules are only used for distinguishing from each other conveniently, but not intended to limit the protection scope of the present disclosure. Regarding a specific working process of the units and modules in the aforesaid device, reference can be made to a corresponding process in the aforesaid method embodiments, it is not repeatedly described herein.

Embodiments of the present disclosure also provide a network device. The network device includes at least one processor, a memory, and a computer program stored in the memory and running on the at least one processor. When the processor executes the computer program, the steps in any of the foregoing method embodiments are implemented.

Embodiments of the present disclosure also provide a computer-readable storage medium in which a computer program is stored. When the computer program is executed by the processor, the steps in each of the foregoing method embodiments can be implemented.

Embodiments of the present disclosure provide a computer program product, when the computer program product runs on a mobile terminal, so that when executed by the mobile terminal, the steps in each of the above method embodiments can be implemented.

When the integrated unit is achieved in the form of software functional units, and is sold or used as an independent product, the integrated unit may be stored in a computer readable storage medium. Based on this understanding, a whole or part of flow process for implementing the method in the embodiments of the present application can also be accomplished in the manner of using computer program to instruct relevant hardware. When the computer program is executed by the processor, the steps in the various method embodiments described above may be implemented. The computer program comprises computer program codes, which may be in the form of source code, object code, executable documents or some intermediate form, etc. The computer readable medium can include: any entity or device that can write the computer program codes into a photographing device/terminal device, recording medium, computer memory, read-only memory (ROM), random access memory (RAM), electrical carrier signal, telecommunication signal and software distribution medium, USB flash disk, mobile hard disk, hard disk, optical disk. The computer readable medium doesn't include electrical carrier signal and telecommunication signal according to legislation and patent practice in some judicial districts.

In the aforementioned embodiments, the descriptions of the embodiments are emphasized respectively, regarding the part of an embodiment which is not described or disclosed in detail, reference can be made to relevant descriptions in some other embodiments.

The person of ordinary skill in the art may be aware of that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present disclosure.

In some embodiments of the present application, it should be understood that the apparatus/network device and method disclosed may be achieved in other ways.

For example, the aforementioned embodiments of the apparatus/network device are schematic merely, for example, the division of the aforementioned modules and units is just a kind of logic function division, some other divisions may be used in actual implementations, for example, a plurality of units or components may be combined or integrated into another system, or some features may be ignored or unexecuted. Another point, the interacted coupling or directly coupling or communication connection displayed or discussed may be indirect coupling or communication connection through some ports, devices or units, and the form of the connection may be electrical connection, mechanical connection, or other types of connection.

The units described as separate components can be or cannot be physically separated, the components shown as units can be or cannot be physical units, the components may be located in one place, or be distributed onto multiple network elements. A part or a whole of the elements can be selected to achieve the objective of the technical solution of this embodiment according to the actual requirement.

The aforementioned embodiments are only intended to illustrate but not to limit the technical solutions of the present disclosure. Although the present disclosure has been explained in detail with reference to the aforementioned embodiments, the skilled person in the art should be aware of the fact that, the technical solutions described in each of the embodiments mentioned above can still be amended, or some technical features in the technical solutions may be replaced equivalently; these amendments or equivalent replacements, which doesn't cause the essence of corresponding technical solution to be broken away from the spirit and the scope of the technical solution in various embodiments of the present disclosure, should all be included in the protection scope of the present disclosure.

What is claimed is:

1. A video stream processing method, the video stream processing method being applied to a terminal device, a first camera and a second camera arranged on a same side of the terminal device, wherein the video stream processing method comprises:
   acquiring a first video stream through the first camera and acquiring a second video stream through the second camera in response to receiving a slow-motion shooting instruction, wherein the slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output;
   encoding the first video stream and the second video stream into a third video stream with a third frame rate, wherein the third frame rate is greater than the first frame rate, and the third frame rate is greater than the second frame rate; and
   acquiring a fourth video stream with a fourth frame rate through performing a frame interpolation algorithm on the third video stream, wherein the fourth frame rate is the same as the frame rate of the slow-motion video stream carried by the slow-motion shooting instruction, and the fourth frame rate is greater than the third frame rate.

2. The video stream processing method according to claim 1, wherein the operation of encoding the first video stream and the second video stream into the third video stream with the third frame rate comprises:
if the first frame rate is greater than the second frame rate, acquiring a fifth video stream with the first frame rate through performing an interpolation algorithm on the second video stream, and cross-encoding the first video stream and the fifth video stream into the third video stream with the third frame rate; and
if the first frame rate is equal to the second frame rate, cross-encoding the first video stream and the second video stream into the third video stream with the third frame rate.

3. The video stream processing method according to claim 1, wherein the operation of acquiring the fourth video stream with the fourth frame rate through performing the frame interpolation algorithm on the third video stream comprises:
if a play instruction issued by a user is received, acquiring the fourth video stream with the fourth frame rate through performing the frame interpolation algorithm on the third video stream.

4. The video stream processing method according to claim 3, characterized in that, after encoding the first video stream and the second video stream into the third video stream with the third frame rate, the method comprises:
writing a slow-motion video stream identifier to the third video stream, and saving it;
after correspondingly acquiring the fourth video stream with the fourth frame rate through performing the frame interpolation algorithm on the third video stream, the method comprises:
replacing the saved third video stream with the fourth video stream.

5. The video stream processing method according to claim 1, wherein the operation of encoding the first video stream and the second video stream into the third video stream with the third frame rate comprises:
acquiring a duration of a predetermined slow-motion video stream; and
selecting a middle segment video frame of the first video stream and a middle segment video frame of the second video stream according to the duration of the predetermined slow-motion video stream, and encoding the selected two middle segment video frames into the third video with the third frame rate stream;
after correspondingly acquiring the fourth video stream with the fourth frame rate through performing the frame interpolation algorithm on the third video stream, the method comprises:
saving following video streams in order and serving the saved video streams as the slow-motion video stream: a front segment video stream generated according to a front segment video frame of the first video stream and a front segment video frame of the second video stream, the fourth video stream, and a back segment video stream generated according to a back segment video frame of the first video stream and a back segment video frame of the second video stream.

6. The video stream processing method according to claim 5, wherein a duration of any selected middle segment video frame meets a following condition:
[a duration of the middle segment video frame/(a duration of the front segment video frame+a duration of the middle segment video frame+a duration of the back segment video frame)] is greater than 90%.

7. The video stream processing method according to claim 1, wherein after the operation of acquiring the first video stream through the first camera and acquiring the second video stream through the second camera in response to receiving the slow-motion shooting instruction, the method comprises:
displaying the first video stream on a preview interface.

8. The video stream processing method according to claim 1, wherein if slow-motion modes are greater than or equal to 2, and different slow-motion modes correspond to different frame rates, before the operation of acquiring the first video stream through the first camera and acquiring the second video stream through the second camera in response to receiving the slow-motion shooting instruction, the method comprises:
if the camera is in the slow-motion mode, recommending a corresponding slow-motion mode according to a motion speed of an object in the preview interface, wherein a recommended strategy is that the greater the motion speed of the object, the slow-motion mode corresponding to the larger frame rate is recommended.

9. The video stream processing method according to claim 1, wherein after the operation of acquiring the first video stream through the first camera and acquiring the second video stream through the second camera, the method comprises:
displaying the frame rate of the slow-motion video stream carried by the slow-motion shooting instruction on the preview interface.

10. A terminal device, comprising a first camera, a second camera, a memory, a processor, and a computer program stored in the memory and executable by the processor, wherein the first camera and the second camera are arranged on a same side of the terminal device, and when executing the computer program, the processor implements steps of:
acquiring a first video stream through the first camera and acquiring a second video stream through the second camera in response to receiving a slow-motion shooting instruction, wherein the slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output;
encoding the first video stream and the second video stream into a third video stream with a third frame rate, wherein the third frame rate is greater than the first frame rate, and the third frame rate is greater than the second frame rate; and
acquiring a fourth video stream with a fourth frame rate through performing a frame interpolation algorithm on the third video stream, wherein the fourth frame rate is the same as the frame rate of the slow-motion video stream carried by the slow-motion shooting instruction, and the fourth frame rate is greater than the third frame rate.

11. The terminal device according to claim 10, wherein the operation of encoding the first video stream and the second video stream into the third video stream with the third frame rate comprises:
if the first frame rate is greater than the second frame rate, acquiring a fifth video stream with the first frame rate through performing an interpolation algorithm on the second video stream, and cross-encoding the first video stream and the fifth video stream into the third video stream with the third frame rate; and if the first frame rate is equal to the second frame rate, cross-encoding the first video stream and the second video stream into the third video stream with the third frame rate.

12. The terminal device according to claim 10, wherein the operation of acquiring the fourth video stream with the fourth frame rate through performing the frame interpolation algorithm on the third video stream comprises:

if a play instruction issued by a user is received, acquiring the fourth video stream with the fourth frame rate through performing the frame interpolation algorithm on the third video stream.

13. The terminal device according to claim 12, wherein when executing the computer program, the processor further implements steps of:

writing a slow-motion video stream identifier to the third video stream, and saving it;

after correspondingly acquiring the fourth video stream with the fourth frame rate through performing the frame interpolation algorithm on the third video stream, replacing, by a fourth video stream storage unit, the saved third video stream with the fourth video stream.

14. The terminal device according to claim 10, wherein the operation of encoding the first video stream and the second video stream into the third video stream with the third frame rate comprises:

acquiring a duration of a predetermined slow-motion video stream; and selecting a middle segment video frame of the first video stream and a middle segment video frame of the second video stream according to the duration of the predetermined slow-motion video stream, and encoding the selected two middle segment video frames into the third video with the third frame rate stream;

after correspondingly acquiring the fourth video stream with the fourth frame rate through performing the frame interpolation algorithm on the third video stream, when executing the computer program, the processor further implements steps of:

saving following video streams in order and serving the saved video streams as the slow-motion video stream:

a front segment video stream generated according to a front segment video frame of the first video stream and a front segment video frame of the second video stream, the fourth video stream, and a back segment video stream generated according to a back segment video frame of the first video stream and a back segment video frame of the second video stream.

15. The terminal device according to claim 14, wherein a duration of any selected middle segment video frame meets a following condition:

[a duration of the middle segment video frame/(a duration of the front segment video frame+a duration of the middle segment video frame+a duration of the back segment video frame)] is greater than 90%.

16. The terminal device according to claim 10, wherein after the operation of acquiring the first video stream through the first camera and acquiring the second video stream through the second camera in response to receiving the slow-motion shooting instruction, when executing the computer program, the processor further implements steps of:

displaying the first video stream on a preview interface.

17. The terminal device according to claim 10, wherein if slow-motion modes are greater than or equal to 2, and different slow-motion modes correspond to different frame rates, before the operation of acquiring the first video stream through the first camera and acquiring the second video stream through the second camera in response to receiving the slow-motion shooting instruction, when executing the computer program, the processor further implements steps of:

if the camera is in the slow-motion mode, recommending a corresponding slow-motion mode according to a motion speed of an object in the preview interface, wherein a recommended strategy is that the greater the motion speed of the object, the slow-motion mode corresponding to the larger frame rate is recommended.

18. The terminal device according to claim 10, wherein after the operation of acquiring the first video stream through the first camera and acquiring the second video stream through the second camera, when executing the computer program, the processor further implements steps of:

displaying the frame rate of the slow-motion video stream carried by the slow-motion shooting instruction on the preview interface.

19. A non-transitory computer-readable storage medium, storing a computer program, wherein the computer program is executed by a processor to implement steps of:

acquiring a first video stream through the first camera and acquiring a second video stream through the second camera in response to receiving a slow-motion shooting instruction, wherein the slow-motion shooting instruction carries a frame rate of a slow-motion video stream, a first frame rate of the first video stream is a maximum frame rate that the first camera can directly output, and a second frame rate of the second video stream is a maximum frame rate that the second camera can directly output;

encoding the first video stream and the second video stream into a third video stream with a third frame rate, wherein the third frame rate is greater than the first frame rate, and the third frame rate is greater than the second frame rate; and acquiring a fourth video stream with a fourth frame rate through performing a frame interpolation algorithm on the third video stream, wherein the fourth frame rate is the same as the frame rate of the slow-motion video stream carried by the slow-motion shooting instruction, and the fourth frame rate is greater than the third frame rate.

20. The computer-readable storage medium according to claim 19, wherein the operation of encoding the first video stream and the second video stream into the third video stream with the third frame rate comprises:

if the first frame rate is greater than the second frame rate, acquiring a fifth video stream with the first frame rate through performing an interpolation algorithm on the second video stream, and cross-encoding the first video stream and the fifth video stream into the third video stream with the third frame rate; and if the first frame rate is equal to the second frame rate, cross-encoding the first video stream and the second video stream into the third video stream with the third frame rate.

* * * * *